May 16, 1961

W. M. McCONNELL 2,984,000

PIPE COUPLING SCREW-ON MACHINE CONTROLS

Filed May 1, 1957

INVENTOR.
William M. McConnell

BY Webb, Mackey + Burden

HIS ATTORNEYS

May 16, 1961  W. M. McCONNELL  2,984,000
PIPE COUPLING SCREW-ON MACHINE CONTROLS
Filed May 1, 1957  4 Sheets-Sheet 2

INVENTOR.
William M. McConnell
BY Webb, Mackey + Burden
HIS ATTORNEYS

May 16, 1961  W. M. McCONNELL  2,984,000
PIPE COUPLING SCREW-ON MACHINE CONTROLS
Filed May 1, 1957  4 Sheets-Sheet 3

INVENTOR.
William M. McConnell
BY Webb, Mackey & Burden

HIS ATTORNEYS

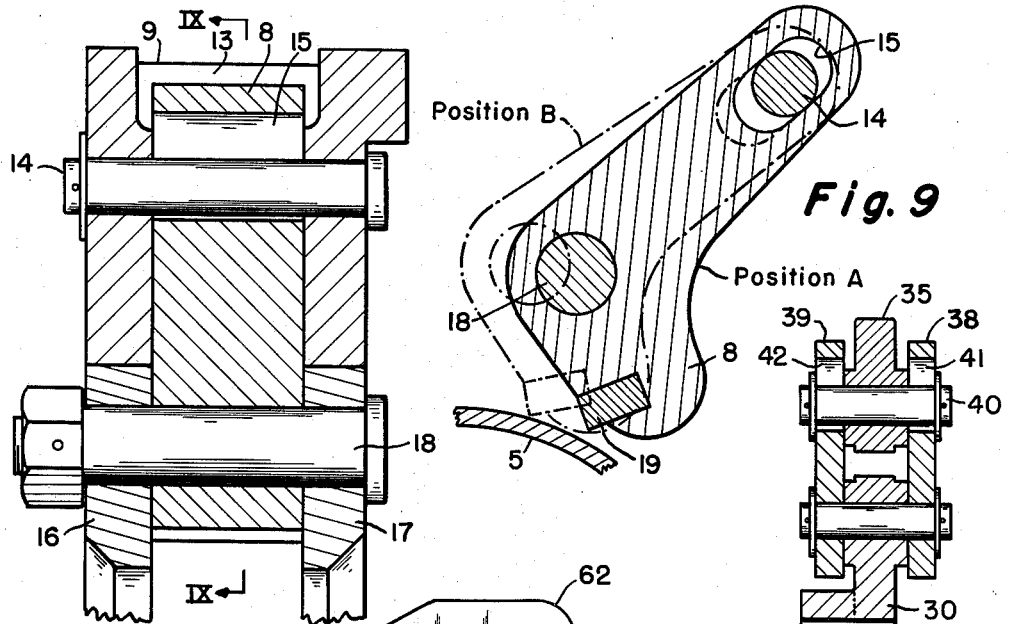
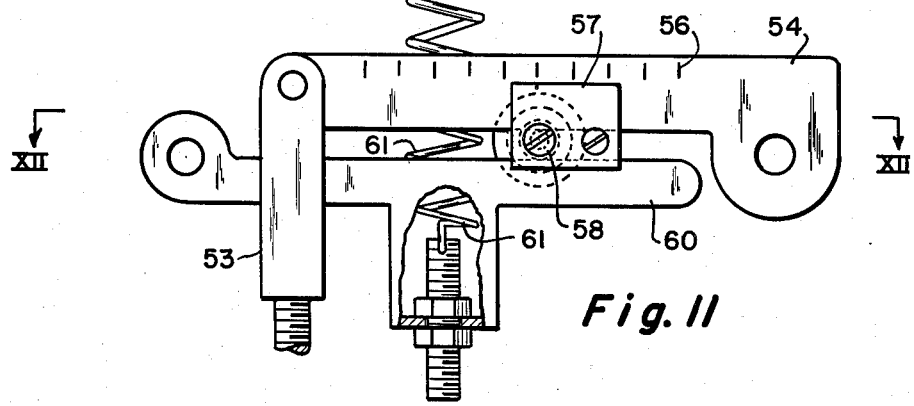
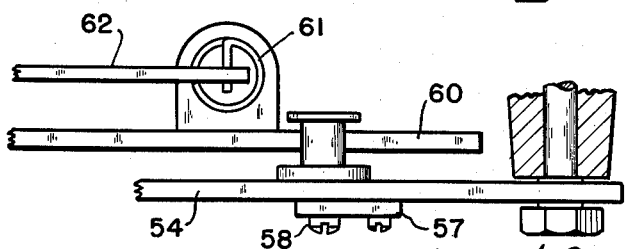

United States Patent Office 2,984,000
Patented May 16, 1961

2,984,000
PIPE COUPLING SCREW-ON MACHINE CONTROLS

William M. McConnell, McKeesport, Pa., assignor to Taylor-Wilson Manufacturing Company, McKees Rocks, Pa., a corporation of Pennsylvania Filed May 1, 1957, Ser. No. 656,999

6 Claims. (Cl. 29—240)

This application is a continuation-in-part of my copending application Serial No. 419,812, filed March 30, 1954, now abandoned.

In the production of commercial pipe, manufacturers customarily apply a coupling to one end of a pipe. Most manufacturers employ a coupling machine which grips the pipe, screws on the coupling and then releases the pipe. For efficient production and processing of pipe these coupling machines should be fully automatic in that after gripping the pipe the machine should then screw on the coupling and automatically stop the operation after the coupling has reached the end of the threaded portion of the pipe. Since the ends of a pipe are not always threaded a uniform distance along the pipe, a pipe coupling machine must necessarily vary the amount of rotation it imparts to a coupling before the coupling runs beyond the threads cut on the pipe. Hence, a fully automatic pipe coupling machine requires a control which accurately determines when each coupling has been threaded the full depth of the threads on the pipe, stops the machine and cooperates with other elements of the machine to free the coupling and pipe from the machine.

My invention provides a pipe coupling control which instantly stops the coupling machine when the coupling has reached the end of the threads of the pipe or when the coupling has been screwed on a threaded end of the pipe a desired amount. This control functions equally well on pipes having unequal lengths of threading as it does on pipes having equal lengths of threading. In addition my control will stop the coupling operation before the coupling machine has overrun and damaged the pipe or the coupling by the application of an excessive amount of torque. My pipe coupling control utilizes the torque exerted by the coupling screw-on machine to stop the screw-on operation when the coupling has been threaded upon the pipe to a desired degree of tightness. Specifically, I employ in a pipe coupling machine having a coupling screw-on means and a gripper for holding a length of threaded pipe, a control comprising a fluid pressure motor adapted to hold fluid under pressure. Connected to the gripper is a torque arm whose other end is connected to or adapted to engage a rod. This rod is connected to the fluid under pressure in the fluid pressure motor. A linkage means has one end connected to the rod and has its other end connected to a movable member so that movement of the rod generated by torque applied to the pipe by the coupling screw-on means during a screwing on operation is transmitted through the torque arm to the movable member. A valve means controls the supply of fluid under pressure to the motor and relief of this fluid under pressure from the motor. The valve means is operated or actuated by movement of the movable member. A means responsive to a predetermined amount of pressure of the fluid in the fluid pressure motor controls the operation of the coupling screw-on means.

In the accompanying drawings I have described a preferred embodiment of my invention in which:

Figure 6 is a sectional view along the line VI—VI of Figure 4;

Figure 8 is a sectional view along the line VIII—VIII of Figure 7;

Figure 9 is a sectional view along the line IX—IX of Figure 8;

Figure 11 is an enlarged view of the pivoted levers having the leverage ratio adjustment shown in Figure 4; and Figure 12 is a view taken along the section lines XII—XII of Figure 11 to show another view of the leverage ratio adjustment means.

Figure 1:
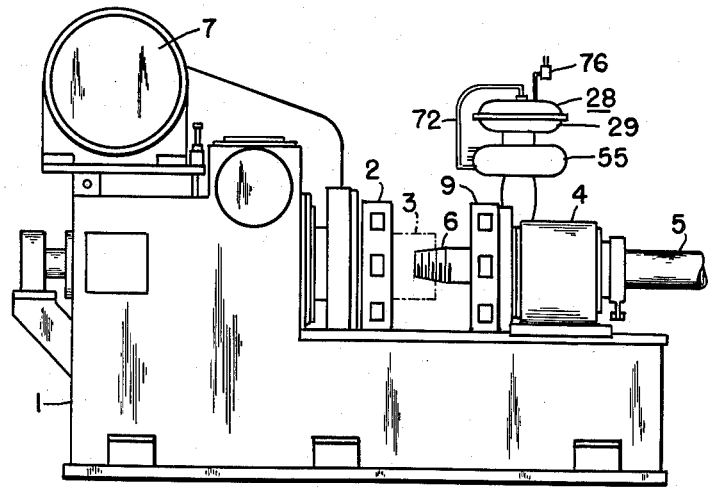
Figure 1 is a side elevation view of a pipe coupling machine equipped with my control.

Figure 1 shows a conventional pipe coupling screw-on machine with a base 1. Mounted upon the base is a coupling gripper 2 which receives and holds a coupling 3. A pipe gripper 4 described in detail hereinafter, rigidly secures a pipe 5 having threads 6 at both ends. The motor 7 mounted upon the machine rotates the coupling gripper 2 to screw the coupling 3 onto the threaded pipe 5. The torque exerted by the coupling screw-on machine upon the pipe when the coupling reaches the end of the threads 6 actuates my control which in turn actuates conventional electric elements which stop the machine and release the coupling 3 and the pipe 5.

Figures 3, 4:
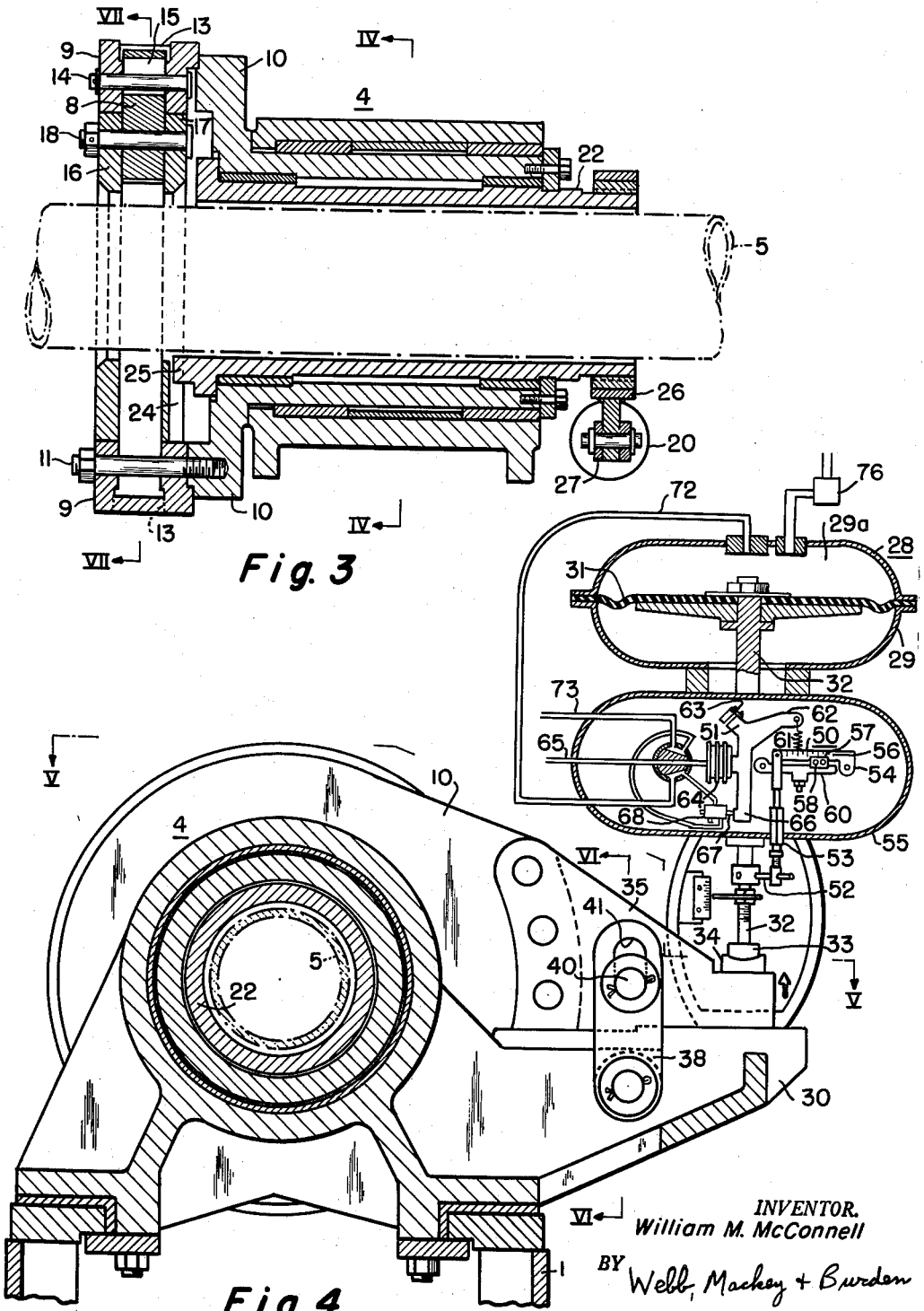
Figure 3 is a sectional view along the line III—III of Figure 2.
Figure 4 is a sectional view along the line IV—IV of Figure 3.

As shown in Figures 3, 4, 7, 8 and 9, the pipe gripper comprises a plurality of clamps 8 mounted in a housing 9 which is connected to outer barrel 10 of the pipe gripper 4 by bolts 11. The housing 9 has a plurality of slots 13 spaced around its outer periphery. As shown in Figures 3 and 8, each clamp is positioned between the walls of the housing and is mounted upon a pin 14. The pins 14 fit through slots 15 in the clamps 8 and the clamps pivot about these pins. Each clamp is also positioned between an inner ring 16 and an inner shifter ring 17 and is mounted upon bolt 18.

Each clamp has a jaw 19 for biting into the pipe and holding it rigid while the coupling machine screws on a coupling.

A conventional push-pull hydraulic cylinder 20 (Figure 2) mounted upon a bracket 21 on the base 1 controls the operation of the clamps 8 by rotating inner barrel 22 (Figure 3) of pipe gripper 4 through a small angle. At one end of the inner barrel 22 are two projections, one of which has the reference number 25 and the other of which is not shown, which fit into slots 23 and 24 of inner shifter ring 17, projection 25 fitting into the slot 24. At the other end of the inner barrel is a lug 26 to which is connected the piston rod 27 of the push-pull hydraulic cylinder 20. When the piston rod 27 is in the position shown in Figure 2, the clamps are retracted. To apply the clamps to a pipe, I use hydraulic pressure in the hydraulic cylinder 20 to pull the piston rod 27 to the right (viewing Figure 2) and move the inner barrel 22 in the direction of the arrow in Figure 2. Turning of the inner barrel 22 moves the shifter ring 17 from position A to position B, Figure 9 and also moves inner ring 16 a corresponding amount since the rings are held together by bolts 18. The moving of the rings causes each clamp to pivot about pin 14 and bite into the pipe.

Figure 2:
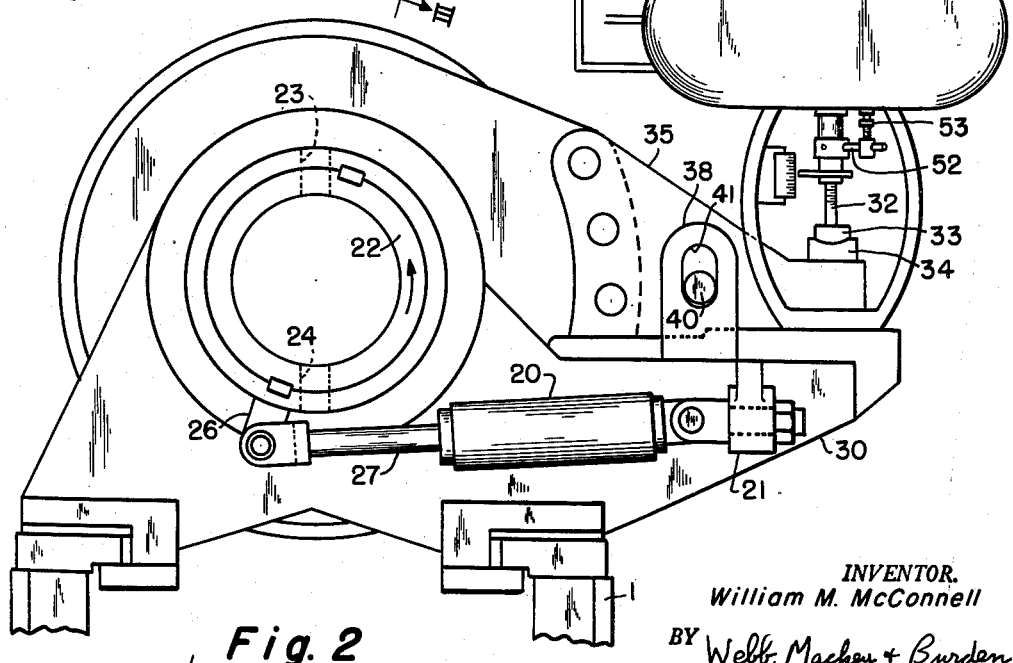
Figure 2 is the right-hand end view of Figure 1.
Figure 5:
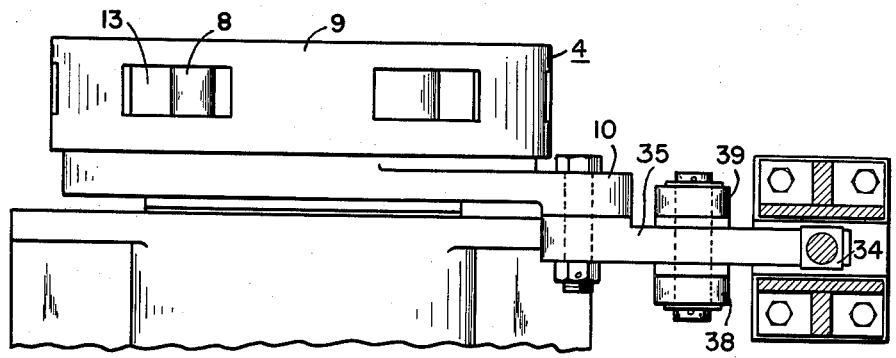
Figure 5 is a sectional view along the line V—V of Figure 4.
Figure 7:
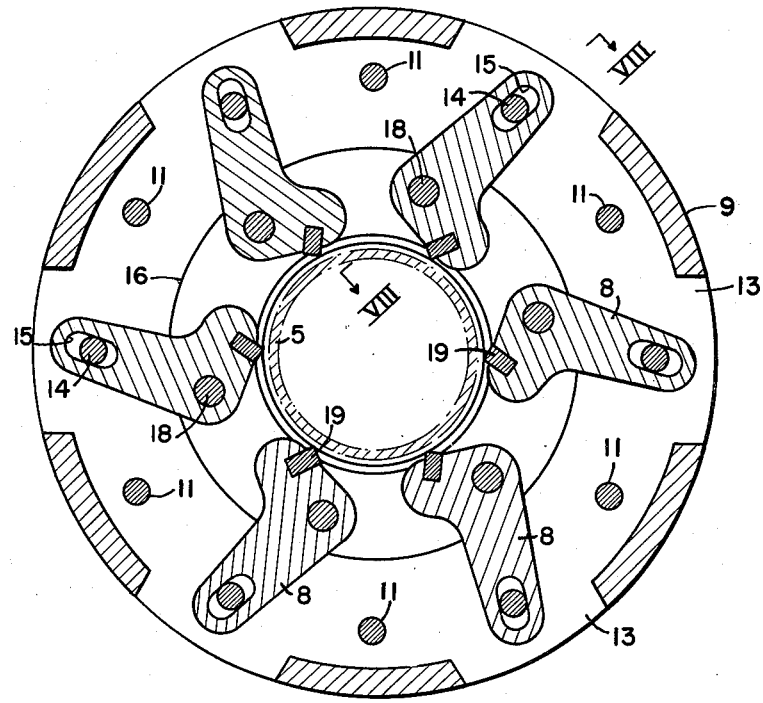
Figure 7 is a sectional view along the line VII—VII of Figure 3.

As shown in Figures 2, 4 and 5, my pipe coupling machine control comprises a diaphragm motor 28 having a casing 29 which is mounted upon a bracket 30 attached to the coupling machine. The casing 29 has a diaphragm 31 which is responsive to fluid pressure, either air or hydraulic, contained therein. Extending from the casing is a stem 32 which has a head 33 adapted to fit into a seat 34 mounted upon one end of a torque arm 35. The stem 32 is connected to diaphragm 31 and hence, is responsive to the fluid pressure within a chamber 29a of the casing 29. The other end of the torque arm 35 is connected to the outer barrel 10 of the pipe gripper 4.

Since the clamps 8 which grip a pipe are mounted in the housing 9 which is connected to the outer barrel 10 of the pipe gripper 4, a torque which is applied to a coupling being screwed onto the pipe will be transmitted from the coupling 3 through the pipe 5 through clamps 8, housing 9, outer barrel 10 to the torque arm 35 and thence to the diaphragm motor 28. Consequently, in response to the application of torque to the pipe, the torque arm 35 tends to move upwardly in the direction of the arrow in Figure 4 thereby exerting an upward thrust upon the stem 32. Hence, the force which the torque arm exerts upon the stem 32 and the diaphragm 31 is directly proportional to the torque applied to a coupling by the coupling machine.

As shown in Figures 4, 11 and 12, a linkage arrangement 50 transmits vertical movement of the stem 32 generated by torque applied to the coupling 3 to a pivoted bell crank lever 51. The linkage arrangement 50 comprises a horizontal arm 52 having one end joined to the stem 32 and the other end connected to the lower end of a vertical member 53. The upper end of the vertical member 53 is secured to one end of a stroke lever 54 whose other end is pivoted to a housing 55 for the linkage arrangement 50 and the bell crank lever 51 together with other elements to be described hereinafter. On the stroke lever is a graduated scale 56 and an index rider 57 which slides therealong. A set screw 58 enables me to position the rider 57 along the graduated scale and thereby control the amount of stroke of the stem 32 required to affect the bell crank lever 51.

The set screw 58 carries a rearwardly protruding portion through which the rider 57 engages a spring lever 60 having one end pivotally secured to the housing 55.

Anchored to the spring lever 60 is one end of a balance spring 61 whose other end is connected to one arm 62 of the bell crank lever 51. Thus, vertical movement of the stem 32 is transmitted through the horizontal arm 52, vertical member 53, stroke lever 54, rider 57, spring lever 60, and the balance spring 61, to the arm 62 of the bell crank lever. The bell crank lever is pivoted to the housing through a flexure bearing 63. A bellows 64 connected to a source of fluid under pressure through a valve controlled line 65 engages the other arm 66 of the bell crank lever and exerts a counterbalance force upon the bell crank lever. This counterbalancing force opposes the force exerted upon arm 62 of the bell crank lever by the balance spring 61. The lower end of the other arm 66 of the bell crank lever engages a valve stem 67 of a three-way close center spring return servo-valve 68 which controls the admission of fluid under pressure to the chamber 29a of the diaphragm motor 28 and its relief therefrom.

The servo-valve 68 permits a flow of fluid under pressure from a source of fluid under pressure (not shown) to the chamber 29a when the stem 32 moves up in response to torque applied to a length of pipe to which a coupling is being attached. The servo-valve also allows fluid under pressure to flow from the chamber 29a when the stem 32 moves down as described hereinafter. The fluid which flows from or escapes from the chamber 29a passes through the servo-valve 68 and into a drain tank (not shown) as described hereinafter.

Figure 10:
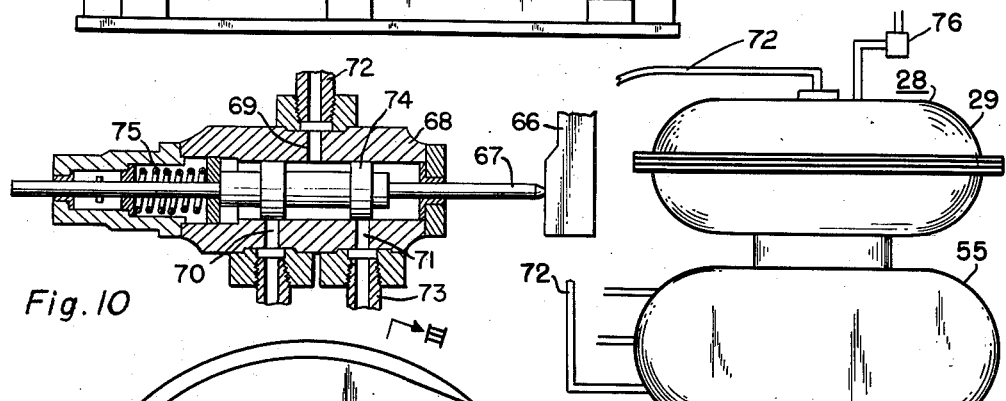
Figure 10 is an enlarged section view of the valve which controls the supply of fluid under pressure to the fluid pressure motor and its relief therefrom.

As shown in Figure 10, the servo-valve 68 has three ports, 69, 70 and 71, with port 69 opening to a conduit 72 which leads from the servo-valve to the chamber 29a. This servo-valve which is actuated by the linkage arrangement and bell crank lever in response to vertical movement of the stem 32 instantly adds fluid under pressure to or bleeds fluid under pressure from the chamber 29a. Thus, the servo-valve reduces to a minimum vertical movement of the stem 32. Port 70 of the servo-valve leads to the drain tank and port 71 connects with a line 73 leading from a source of fluid under pressure.

A valve spool 74 mounted upon the stem 67 controls the flow of fluid under pressure to and from the chamber 29a. A coil spring 75 maintains the valve in a neutral position with the spool blocking ports 70 and 71. When the spool is moved to the right viewing Figure 10, ports 69 and 71 are interconnected and port 70 is blocked so that fluid under pressure enters port 71, flows through the valve and exits through port 69 to the conduit 72 and thence to the chamber 29a. Correspondingly, when the spool is shifted to the left viewing Figure 4, ports 69 and 70 are interconnected and port 71 is blocked so that fluid under pressure escapes from the chamber 29a and flows through the servo-valve 68 and exits through port 70 to the drain tank.

Connected to the chamber 29a as shown in Figure 4 is a fluid pressure electric switch 76 which operates electrical circuits controlling the motor 7 which screws a coupling onto the length of pipe 5. The electric switch 76 can be adjusted to operate the electric circuits over a range of fluid presures, thereby enabling me to control to a high degree the amount of torque applied to couplings being screwed onto a threaded pipe. In other words, by setting the electric switch 76 to operate the electric circuits at a predetermined pressure within the chamber 29a, corresponding to a desired tightness to which a coupling is attached, I terminate the screwing-on operation when the fluid pressure within the chamber 29a reaches the value set on the electric switch. Accordingly, my control enables pipe manufacturers to meet specifications calling for loosely or tightly attached couplings.

My control utilizes the torque exerted by the coupling screw-on machine upon a length of pipe to which the coupling is being mounted as described hereinafter. When the coupling reaches the end of the threads on a length of pipe, an upward thrust generated by the screwing-on operation moves the torque arm 35 and correspondingly, the stem 32 upwardly, thereby causing the linkage arrangement 50, acting through horizontal arm 52, vertical member 53, stroke lever 54, spring lever 60, balance spring 61, to move arm 62 of the bell crank lever 51 upwardly. Upward movement of the arm 62 causes the other arm 66 of the bell crank lever to move to the right viewing Figure 3, thereby enabling the valve spool 74 to move to the right so that ports 69 and 71 are interconnected. Then, fluid under pressure flows through the valve 68, through the conduit 72 into the chamber 29a where the additional fluid under pressure acts upon the diaphragm 31 and forces the stem 32 downwardly. As the stem 32 moves downward, the linkage arrangement 50 pulls arm 62 of the bell crank lever 51 down and moves the other arm 66 to the left viewing Figure 3. Movement of the arm 66 to the left causes spool 74 to block port 71 and to stop the flow of fluid under pressure to the chamber 29a. Generally, when the stem 32 moves downward after an addition of fluid under pressure to the chamber 29a, the bell crank lever moves the spool 74 to a neutral position where it blocks ports 70 and 71.

An increase in the fluid pressure in the chamber 29a caused by the addition of fluid under pressure as described increases the fluid in the chamber 29a until the pressure reaches that value at which the electric switch is set to operate. When this predetermined pressure within chamber 29a is attained, the switch operates electric circuits to stop the screwing-on operation and release the coupling and the pipe. Next, the pipe with the coupling screwed thereon is kicked out of the machine by a pipe throw-out device (not shown). The pressure at which the electric switch operates is set to coincide with the amount of torque required to screw on a coupling to effect a desired fitting, either tight or loose.

Fluid under pressure is introduced into the bellows 64 to provide a counterbalance force which acts against the balance spring and the coil spring 75 in the servo-valve 68 so as normally to hold the spool of the latter in its neutral or centered position. The bellows 64 acting upon arm 66 of the bell crank lever avoids bleeding fluid from the chamber 29a during downward travel of the stem 32 while the coupling attaching operation is progressing and after fluid under pressure has been added to the chamber 29a to compensate for an upward movement of the stem 32. However, the bellows does not prevent flow of fluid from the chamber 29a after a coupling has been screwed on and the upward thrust removed from the stem 32 or when there is an unexpected release or lessening of upward thrust during a screwing-on operation. If the bellows did not exert a counterbalance force against arm 66 of the bell crank lever 51, after an addition of fluid under pressure to the chamber 29a, there would be an over-travel of the stem 32 downwardly in which case, an unwanted amount of fluid under pressure would escape from the chamber 29a and thus adversely affect functioning of my control.

At the end of a screwing-on operation and after the upward thrust has been removed from the stem 32, the fluid under pressure added to the chamber 29a during the screwing-on operation escapes therefrom and flows through servo-valve 68 into the drainage tank.

To prevent damage to the diaphragm motor from over-travel of the torque arm in the event the switch 76 or electric circuits fail, I provide a pair of arms 38 and 39 which straddle the torque arm 35 and which are connected to bracket 30. As shown in Figures 4, 5 and 6, pin 40 affixed to the torque arm fits in slots 41 and 42 in the arms thereby limiting the travel of the torque arm to the length of the slots.

Since my pipe coupling machine control depends upon the torque applied to the pipe gripper when the coupling reaches the end of the threading, my invention controls the operation of the coupling machine irrespective of the length of threading for successive pieces of pipe. Once my control has been adjusted to actuate the fluid pressure electric switch when a coupling has been fitted onto a length of pipe with a desired degree of tightness, it needs no further adjustment. Therefore, it is apparent that my control is highly useful to pipe manufactures because it provides a sure and efficient control for coupling screw-on machines.

While a certain present preferred embodiment of my invention has been shown and described, it will be understood that it may be otherwise embodied within the scope of the appended claims.

I claim:

1. A control system for applying an equal and opposite reaction to a Prony brake type of torque arm to take the reaction exerted by turning torque means coupled thereto, said turning torque means being power operated and reversible, said control system comprising the combination of a servo motor element, a shiftable rod element forming an operative force transmitting connection between said servo motor element and said torque arm, means including a supply conduit connected to supply pressure fluid to said servo motor element, a linkage connected for movement with said rod element, a valve operated by said linkage and connected to control flow of pressure fluid through said conduit, whereby force transmitted by said arm through said rod element is opposed by a reactionary force produced by fluid pressure within said motor element, and power operating means including a reversing switch operatively connected to one of said elements for reversing said turning torque means at and above a point of predetermined reaction.

2. A control for a pipe coupling screw-on machine comprising a fluid pressure motor adapted to hold fluid under pressure, a rod having one end connected to the fluid under pressure in said motor and having the other end in engagement with one end of a movable torque arm, said rod being movably disposed for movement in response to movement of said torque arm, the other end of said torque arm being adapted for connection to an element of said machine which is subject to and/or transmits torque imparted to a pipe or coupling disposed in said machine, linkage means connected to said rod and to one end part of a pivoted member disposed for movement about its pivot so that movement of said rod generated by movement of said torque arm is transmitted through said rod and linkage means to said pivoted member and causes it to move about its pivot, valve means for controlling the supply of fluid under pressure to said motor and its relief therefrom, said valve means being connected into conduit means connecting said fluid pressure motor with a source of fluid under pressure, said valve means being connected to the other end part of said pivoted member and being actuated by movement of said pivoted member, and means responsive to a predetermined amount of pressure of said fluid under pressure of said motor for regulating screwing-on of said coupling.

3. The control of claim 2 characterized by means connected to each of said end parts of said pivoted member to normally maintain said pivoted member in a given position whereat said valve means is normally maintained in a neutral position.

4. A control for a pipe coupling screw-on machine comprising a fluid pressure motor adapted to hold fluid under pressure, said motor having a diaphragm responsive to said fluid under pressure, a rod having one end connected to said diaphragm and having the other end in engagement with one end of a movable torque arm, said rod being movably disposed for movement in response to movement of said torque arm, the other end of said torque arm being adapted for connection to a gripper which engages a length of pipe in said machine, linkage means connected to said rod and connected to one end part of a pivoted member disposed for movement about its pivot so that movement of said rod generated by movement of said torque arm is transmitted through said rod and linkage means to said pivoted member and causes it to move about its pivot, valve means for controlling the supply of fluid under pressure to said motor and its relief therefrom, said valve means being connected into conduit means connecting said fluid pressure motor with a source of fluid under pressure, said valve means being connected to the other end part of said pivoted member and being actuated by movement of said pivoted member, and means responsive to a predetermined amount of pressure of said fluid under pressure of said motor for regulating screwing-on of said coupling.

5. The control of claim 4 characterized by means connected to said end parts of said pivoted member to normally maintain it in a given position whereat said valve means is normally maintained in a neutral position.

6. A control for a pipe coupling screw-on machine comprising a fluid pressure motor adapted to hold fluid under pressure, a rod having one end connected to the fluid under pressure in said motor and having the other end in engagement with one end of a movable torque arm, said rod being movably disposed for movement in response to movement of said torque arm, the other end of said torque arm being adapted for connection to an element of said machine which is subject to and/or transmits torque imparted to a pipe or coupling disposed in said machine, valve means for controlling the supply of fluid under pressure to said motor and its relief therefrom, said valve means being connected to conduit means connecting said fluid pressure motor with a source of fluid under pressure, linkage means connected to said rod and to said valve means so that movement of said rod generated by movement of said torque arm actuates said valve means, and means responsive to a predetermined amount of pressure of said fluid under pressure of said motor for regulating screwing-on of said coupling.

References Cited in the file of this patent

UNITED STATES PATENTS

| | | |
|---|---|---|
| 1,648,944 | Hofstetter | Nov. 15, 1927 |
| 1,891,121 | Thoreson | Dec. 13, 1932 |
| 2,182,659 | Cook | Dec. 5, 1939 |
| 2,361,206 | Hoppe | Oct. 24, 1944 |
| 2,415,552 | Broecker | Feb. 11, 1947 |
| 2,638,075 | Towler | May 12, 1953 |
| 2,638,875 | Bowditch et al. | May 19, 1953 |
| 2,639,497 | Stouffer | May 26, 1953 |
| 2,663,334 | Tinsman | Dec. 22, 1953 |
| 2,697,909 | Chandler | Dec. 28, 1954 |
| 2,736,219 | May | Feb. 28, 1956 |
| 2,756,490 | Sawdey | July 31, 1956 |
| 2,781,026 | Schlatter et al. | Feb. 12, 1957 |
| 2,781,744 | Williams | Feb. 19, 1957 |